(12) United States Patent
Tsai et al.

(10) Patent No.: US 8,670,464 B2
(45) Date of Patent: Mar. 11, 2014

(54) MULTI-VIEW VIDEO CODING/DECODING METHOD

(75) Inventors: Tsung-Han Tsai, Taoyuan County (TW); Te-Yuang Shen, Taipei (TW); Yu-Nan Pan, Taipei (TW)

(73) Assignee: National Central University, Taoyuan County (TW)

( * ) Notice: Subject to any disclaimer, the term of this patent is extended or adjusted under 35 U.S.C. 154(b) by 526 days.

(21) Appl. No.: 12/560,441

(22) Filed: Sep. 16, 2009

(65) Prior Publication Data

US 2010/0316121 A1   Dec. 16, 2010

(30) Foreign Application Priority Data

Jun. 11, 2009   (TW) ................................ 98119551 A

(51) Int. Cl.
*H04J 3/00*       (2006.01)

(52) U.S. Cl.
USPC .................. 370/476; 375/240.25; 375/240.12

(58) Field of Classification Search
USPC ................................................ 370/465–476
See application file for complete search history.

(56) References Cited

U.S. PATENT DOCUMENTS

| | | | | |
|---|---|---|---|---|
| 2003/0198377 | A1* | 10/2003 | Ng ................. | 382/154 |
| 2005/0018040 | A1* | 1/2005 | Buchner et al. ............ | 348/14.08 |
| 2006/0146143 | A1* | 7/2006 | Xin et al. .................... | 348/218.1 |
| 2006/0165169 | A1* | 7/2006 | Ng et al. ................. | 375/240.12 |
| 2008/0089428 | A1* | 4/2008 | Nakamura et al. ........ | 375/240.26 |
| 2008/0240590 | A1* | 10/2008 | Moon et al. .................... | 382/236 |
| 2008/0253671 | A1* | 10/2008 | Choi et al. .................... | 382/238 |
| 2009/0147860 | A1* | 6/2009 | Pandit et al. ............... | 375/240.26 |
| 2009/0168874 | A1* | 7/2009 | Su et al. .................... | 375/240.12 |
| 2010/0142614 | A1* | 6/2010 | Pandit et al. ............. | 375/240.02 |
| 2010/0142617 | A1* | 6/2010 | Koo et al. ................ | 375/240.16 |
| 2011/0063409 | A1* | 3/2011 | Hannuksela .................... | 348/42 |

FOREIGN PATENT DOCUMENTS

WO   WO 2007/114611 A1 * 10/2007

OTHER PUBLICATIONS

Buffer Requirement Analyses for Multiview Video Coding (26th Picture Coding Symposium, Lisbon, Portugal, Nov. 2007).

* cited by examiner

*Primary Examiner* — Kwang B Yao
*Assistant Examiner* — Juvena Loo
(74) *Attorney, Agent, or Firm* — CKC & Partners Co., Ltd.

(57) ABSTRACT

A multi-view video coding method includes the following steps: an un-coded group of pictures (GOP) is obtained from an un-coded multi-view video. Wherein, the un-coded GOP includes picture sets of several un-coded views. Several present coding views are selected from the un-coded views according to view levels of the un-coded views. Wherein, picture sets of the present coding views includes several present coding pictures. A target coding picture is selected from the present coding pictures according to view levels of and temporal levels of the present coding pictures. At least a coded reference picture, which is referenced by the target coding picture for prediction, is obtained. The target coding picture is coded according to the coded reference picture. In addition, a multi-view video decoding method is also disclosed.

16 Claims, 5 Drawing Sheets

MULTI-VIEW VIDEO CODING/DECODING METHOD

RELATED APPLICATIONS

This application claims priority to Taiwan Application Serial Number 98119551, filed Jun. 11, 2009, which is herein incorporated by reference.

BACKGROUND

1. Field of Invention

The present invention relates to a coding/decoding method. More particularly, the present invention relates to a multi-view video coding/decoding method.

2. Description of Related Art

A major concern in video technology today is to extend the functionalities of available applications. Two key applications are free viewpoints video and 3D-TV. Wherein, multi-view video coding (MVC) is regarded as the essential technology of these applications, in which video sequences are acquired by multiple cameras simultaneously. While the number of views is large, the video sequences often introduce huge amounts of data, which needed to be stored or transmitted to the user particularly. Therefore, a highly efficient compression technique is necessary for MVC.

To encode multi-view video sequences, a typical coding structure employed the hierarchical prediction and inter-view prediction based on H.264/AVC. Recently, the inter-view prediction is supported in the latest draft specification of MVC as an extension of H.264/Advanced Video Coding (AVC) standard.

One of the critical issues to realize a MVC is how to make it efficient in terms of resource consumption, such as memory size, bandwidth and power. The memory size for MVC is substantially increased due to the increase of the decoded picture buffer (DPB) size, which is used as storing decoded pictures for prediction of following pictures. The required DPB size for MVC is increased because both hierarchical and inter-view predictions are employed and large numbers of views are coded. Therefore, a multi-view coding/decoding method is needed to reduce the picture buffer size.

SUMMARY

According to one embodiment of this invention, a multi-view video coding method includes the following steps: an un-coded group of pictures (GOP) is obtained from an un-coded multi-view video. Wherein, the un-coded GOP includes picture sets of several un-coded views. Several present coding views are selected from the un-coded views according to view levels of the un-coded views. Wherein, picture sets of the present coding views includes several present coding pictures. A target coding picture is selected from the present coding pictures according to view levels and temporal levels of the present coding pictures. At least a coded reference picture, which is referenced by the target coding picture for prediction, is obtained. The target coding picture is coded according to the coded reference picture.

According to another embodiment of this invention, a multi-view video decoding method includes the following steps: a coded GOP is obtained from a coded multi-view video. Wherein, the coded GOP includes picture sets of several coded views. Several present decoding views are selected from the coded views according to view levels of the coded views. Wherein, picture sets of the present decoding views includes several present decoding pictures. A target decoding picture is selected from the present decoding pictures according to view levels of the present decoding pictures and temporal levels of the present decoding pictures. At least a decoded reference picture, which is referenced by the target decoding picture for prediction, is obtained. The target decoding picture is decoded according to the decoded reference picture.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
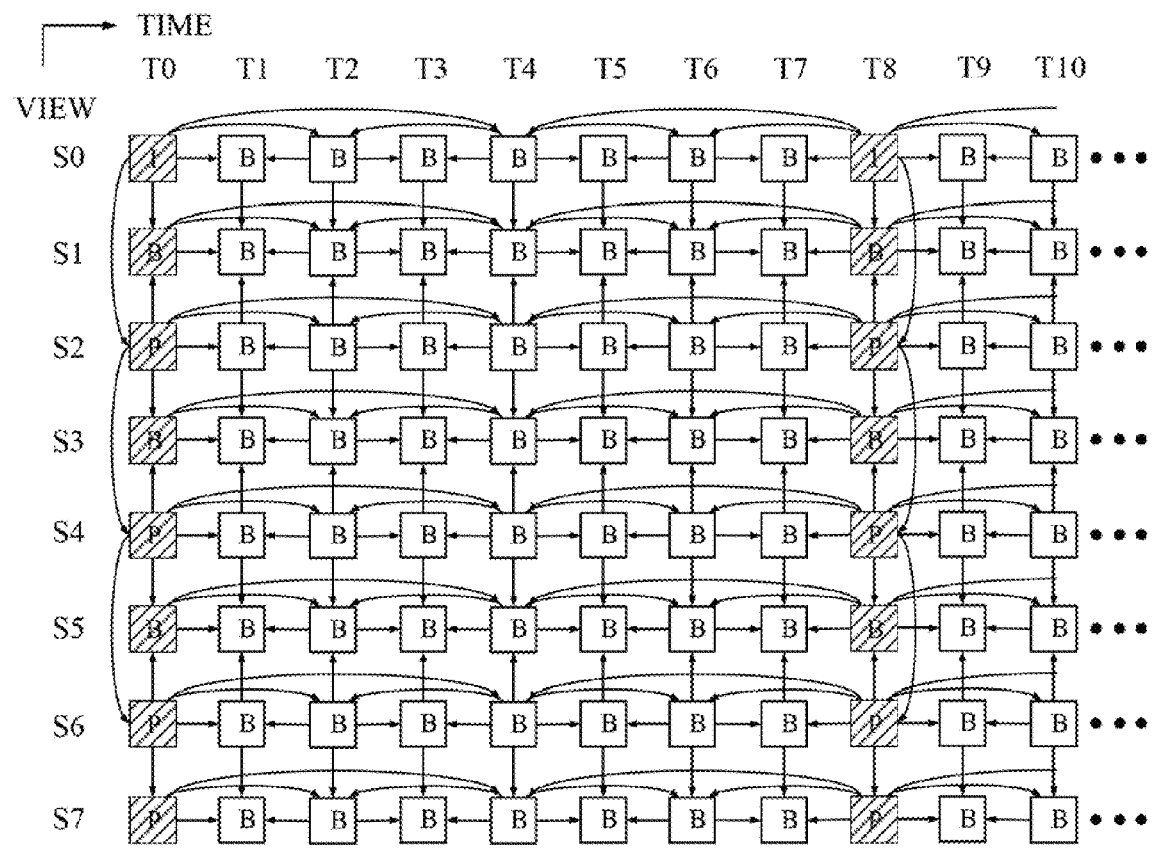
FIG. 1 is a multi-view video 100 applied a prediction structure employing hierarchical prediction for each view and inter-view prediction for every second view for MVC.

Reference will now be made in detail to the present embodiments of the invention, examples of which are illustrated in the accompanying drawings. Wherever possible, the same reference numbers are used in the drawings and the description to refer to the same or like parts.

A hierarchical B prediction structure for single view contains a key (anchor) picture and non-key (non-anchor) pictures for each group of pictures (GOP). The anchor pictures are coded as I (Intra-coded) picture or P (predictive) picture in regular intervals. The remaining pictures (non-anchor pictures) of GOP are coded as B (bi-directional predictive) pictures, which are hierarchically predicted. The hierarchical prediction structure ensures that all pictures are predicted by the pictures from the same or lower temporal level to support temporal scalability.

FIG. 1 is a multi-view video 100 applied a prediction structure employing hierarchical prediction for each view and inter-view prediction for every second view for MVC. Sn and Tn denote the individual view sequences and the consecutive time-instance of a multi-view video 100. The multi-view video 100 is divided into several GOPs by the anchor pictures, such as T0, T8 in FIG. 1. Picture set of Sn in the multi-view video 100 denotes pictures Sn/T0~Sn/T8. Picture set of Tn in the multi-view video 100 denotes pictures S0/Tn~S7/Tn. In other embodiments, the method for dividing a multi-view video into GOPs may be different according to the prediction structure applied.

The view sequences S0~S7 of the multi-view video 100 are classified into different view level according to the inter-view prediction. In detail, view level of a predicted picture is defined to be the highest view level of a referenced picture, which is referenced by the predicted picture for prediction, plus 1. Therefore, since picture sets of S0, S2, S4 and S6 are coded/decoded without referencing to picture sets of other views, view levels of pictures in the picture sets of S0, S2, S4 and S6 are defined to be 0. In addition, since the highest view levels of referenced pictures referenced by picture sets of S1, S3, S5 and S7 are 0, view levels of pictures in the picture sets of S1, S3, S5 and S7 are defined to be 1 (=0+1). In other embodiments, view levels of pictures may be defined differently as different prediction structure is applied.

The time-instances T0~T8 of the multi-view video 100 are classified into different temporal level according to the relationship of temporal prediction. In detail, temporal level of a predicted picture is defined to be highest temporal level of a referenced picture, which is referenced by the predicted picture, plus 1. Therefore, since picture sets of T0 and T8 are coded/decoded without referencing to picture sets of other time-instance, temporal levels of pictures in the picture sets of T0 and T8 are defined to be 0. In addition, since the highest temporal levels of referenced pictures referenced by picture sets of T4 are 0 (temporal levels of picture sets of both T0 and T8), temporal levels of pictures in the picture sets of T4 are defined to be 1 (=0+1). In the same way, temporal levels of pictures in the picture sets of T2 and T6 are defined to be 2, and temporal levels of pictures in the picture sets of T1, T3, T5 and T7 are defined to be 3.

Figure 2:
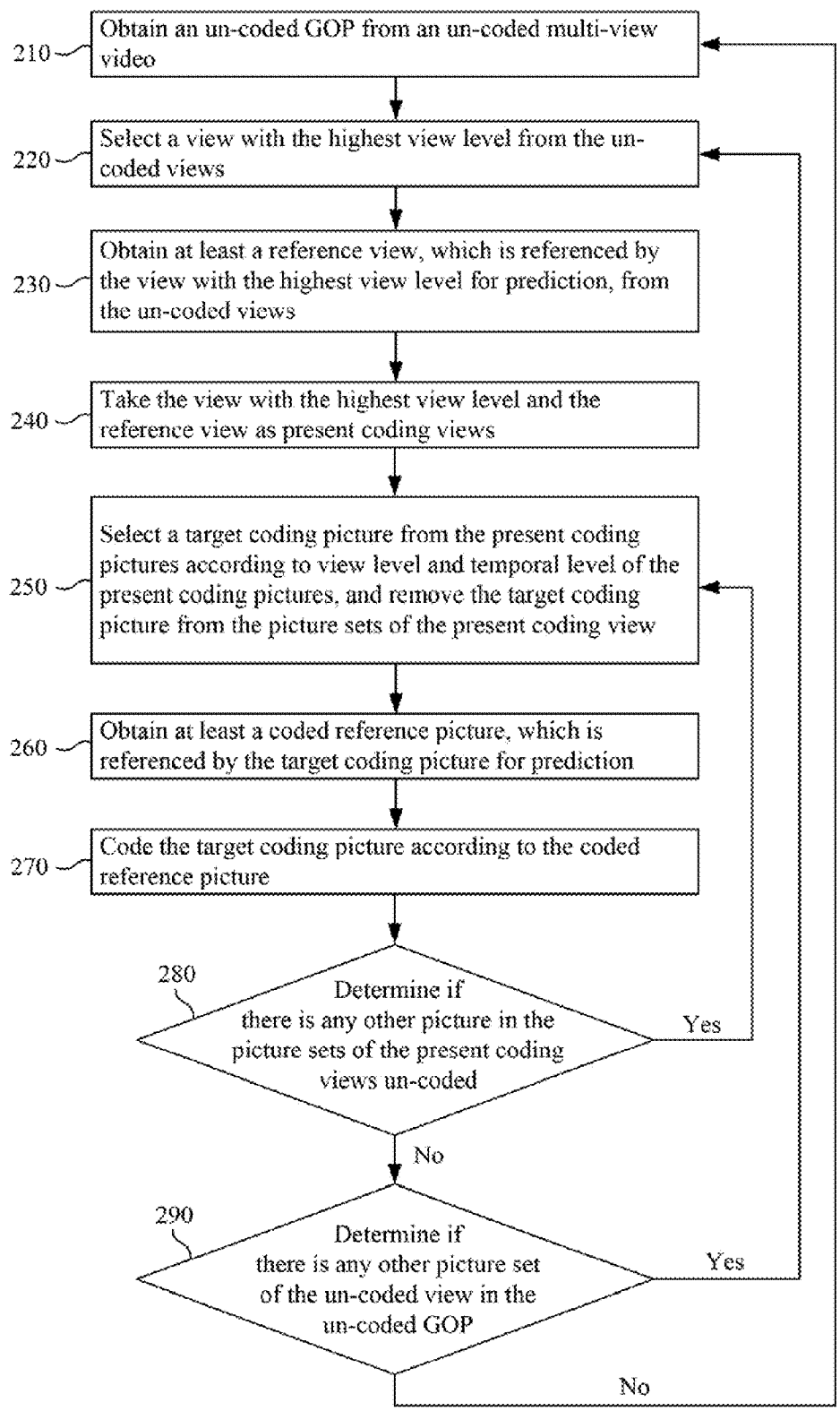
FIG. 2 is a flow diagram of a multi-view video coding method according to an embodiment of this invention.

FIG. 2 is a flow diagram of a multi-view video coding method according to an embodiment of this invention. In the multi-view video coding method, each picture of an un-coded GOP is selected and coded sequentially according to the view level and temporal level of each picture.

Refer to FIG. 1 and FIG. 2. The multi-view video coding method 200 includes the following steps:

In step 210, obtain an un-coded GOP from an un-coded multi-view. For example, if the multi-video 100 is an un-coded multi-view video, pictures of the multi-view video 100 at S0~S7 during T0~T8 may be obtained as the un-coded is GOP. Wherein, the un-coded GOP includes picture sets of un-coded view S0~S7.

In step 220, select a view with the highest view level from the un-coded views of the un-coded GOP. Therefore, S1 may be selected from the un-coded view S0~S7 since view level of S1 is the highest among view levels of the un-coded views S0~S7. In other embodiments, S3, S5 and S7 may be selected since view levels of S3, S5 and S7, which equal to view level of S1, are also the highest among view levels of the un-coded views S0~S7.

In step 230, obtain at least a reference view, which is referenced by the view with the highest view level for prediction, from the un-coded views. Therefore, S0 and S2 are selected as reference views since S0 and S2 are referenced by S1 for prediction in this embodiment.

In step 240, take the view with the highest view level and the reference view as present coding views. Therefore, S0, S1 and S2 are taken as the present coding views. Then, the present coding views S0, S1 and S2 are selected from the un-coded views S0~S7 according to view levels of the un-coded views S0~S7 by step 220~step 240. Wherein, picture sets of the present coding views S0, S1 and S2 include several present coding pictures S0/T0~S0/T8, S1/T0~S1/T8 and S2/T0~S2/T8, and the present coding pictures S0/T0~S0/T8, S1/T0~S1/T8 and S2/T0~S2/T8 may be removed from the un-coded GOP.

In step 250, select a target coding picture from the present coding pictures according to view levels and temporal levels of the present coding pictures, and remove the target coding picture from the picture sets of the present coding view. Wherein, step 250 may include step of selecting a picture with highest temporal level and lowest view level from the present coding pictures to be the target coding picture. In detail, a view, which contains the most number of pictures with highest temporal level among the present coding views, is selected to be a target coding view. If the number of candidates for the target coding view is more than one, the candidate with the lowest view level is selected to be the target coding view. Then, select an un-coded picture with highest temporal level from picture sets of the target coding view to be the target coding picture. If the number of candidates for the target coding picture is more than one, the candidate, which is the first in display order among the candidates for the target coding picture, is selected to be the target coding picture. Therefore, since temporal level of S0 is the highest and view level of S0 is the lowest among the present coding views S0, S1 and S2, S0 is selected to be the target coding view. Then, since S0/T1 is the picture with highest temporal level and to be the first in display order among pictures S0/T0~S0/T8 of the target coding view S0, S0/T1 is selected to be the target coding picture.

In step 260, obtain at least a coded reference picture, which is referenced by the target coding picture for prediction. Then, in step 270, code the target coding picture according to the coded reference picture. Since the target coding picture S0/T1 references S0/T0 and S0/T2 for prediction, coded reference pictures of S0/T0 and S0/T2 is obtained (step 260) for coding the target coding picture S0/T1 (step 270).

In another embodiment, step 250 may include the step of selecting a picture with lowest temporal level and highest view level from the present is coding pictures to be the target coding picture. In detail, pictures with lowest temporal level with the same time instance among the picture sets of the present coding views are selected. If the number of the candidate time instances is more than one, the candidate, which is the first in display order among the candidate time instances, is selected. Then, the picture with highest view level among the selected pictures is selected to be the target coding picture for being coded by step 260~step 270. Therefore, since temporal levels of pictures S0/T0~S2/T0 are lowest and first in display order among the present coding pictures S0/T0~S0/T8, S1/T0~S1/T8 and S2/T0~S2/T8, S0/T0~S2/T0 are selected. Then, picture S1/T0, whose view level is highest among the selected pictures S0/T0~S2/T0, is selected to be the target coding picture for being coded by step 260~step 270.

In step 280, determine if there is any other picture in the picture sets of the present coding views un-coded. If there is at least one picture in the picture sets of the present coding views un-coded, select the next target coding picture from the present coding pictures (step 250). Therefore, the present coding pictures would be coded sequentially by step 250~step 280.

In step 290, if there is no other picture in the picture sets of the present coding views un-coded, determine if there is any other picture set of the un-coded views in the un-coded GOP. Before the determination in step 290 is made, remove the picture sets of the present coding views from the un-coded GOP.

If there is at least a picture set of the un-coded view in the un-coded GOP, select next view with highest view level from the un-coded views of the un-coded GOP (step 220). Therefore, the whole un-coded GOP would be coded by step 220~step 280.

If there is no other picture set of the un-coded view in the un-coded GOP, obtain next un-coded GOP from the un-coded multi-view video (step 210). Therefore, the whole multi-view video would be coded by step 210~step 280.

Figure 3:
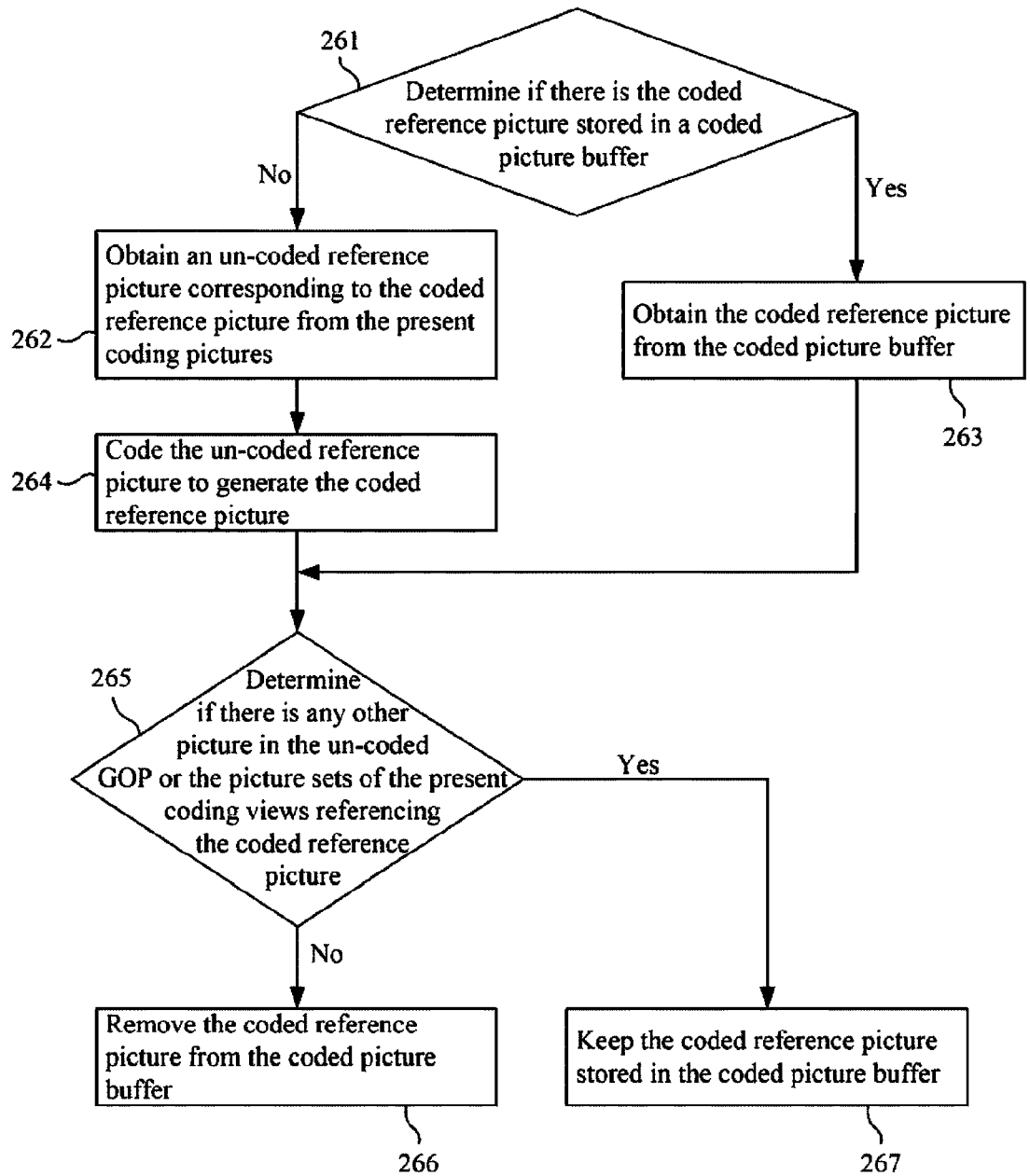
FIG. 3 is a flow diagram of obtaining the coded reference picture (step 260) in FIG. 2.

FIG. 3 is a flow diagram of obtaining the coded reference picture (step 260) in FIG. 2. Obtaining the coded reference picture (step 260) includes the following steps:

In step 261, determine if there is the coded reference picture, which is referenced by the target coding picture for prediction, stored in a coded picture buffer.

In step 262, if there isn't the coded reference picture stored in the coded picture buffer, obtain an un-coded reference picture corresponding to the coded reference picture from the picture sets of the present coding views. Then, in step 264, code the un-coded reference picture to generate the coded reference picture In step 263, if there is the coded reference picture stored in the coded picture buffer, obtain the coded reference picture from the coded picture buffer. Therefore, the coded reference picture may be obtained by step 261~step 264.

In addition, in step 265, determine if there is any other picture in the un-coded GOP or the picture sets of the present coding views referencing the coded reference picture for prediction. In step 267, if there is at least a picture in the un-coded GOP and the picture sets of the present coding views referencing the coded reference picture for prediction, keep the coded reference picture stored in the coded picture buffer. In step 266, if there is no other picture in the un-coded GOP and the picture sets of the present coding views referencing the coded reference picture for prediction, remove the coded reference picture from the coded picture buffer. Therefore, the size of the coded picture buffer may be reduced since the coded reference picture not being referenced latter is removed.

Figure 4:
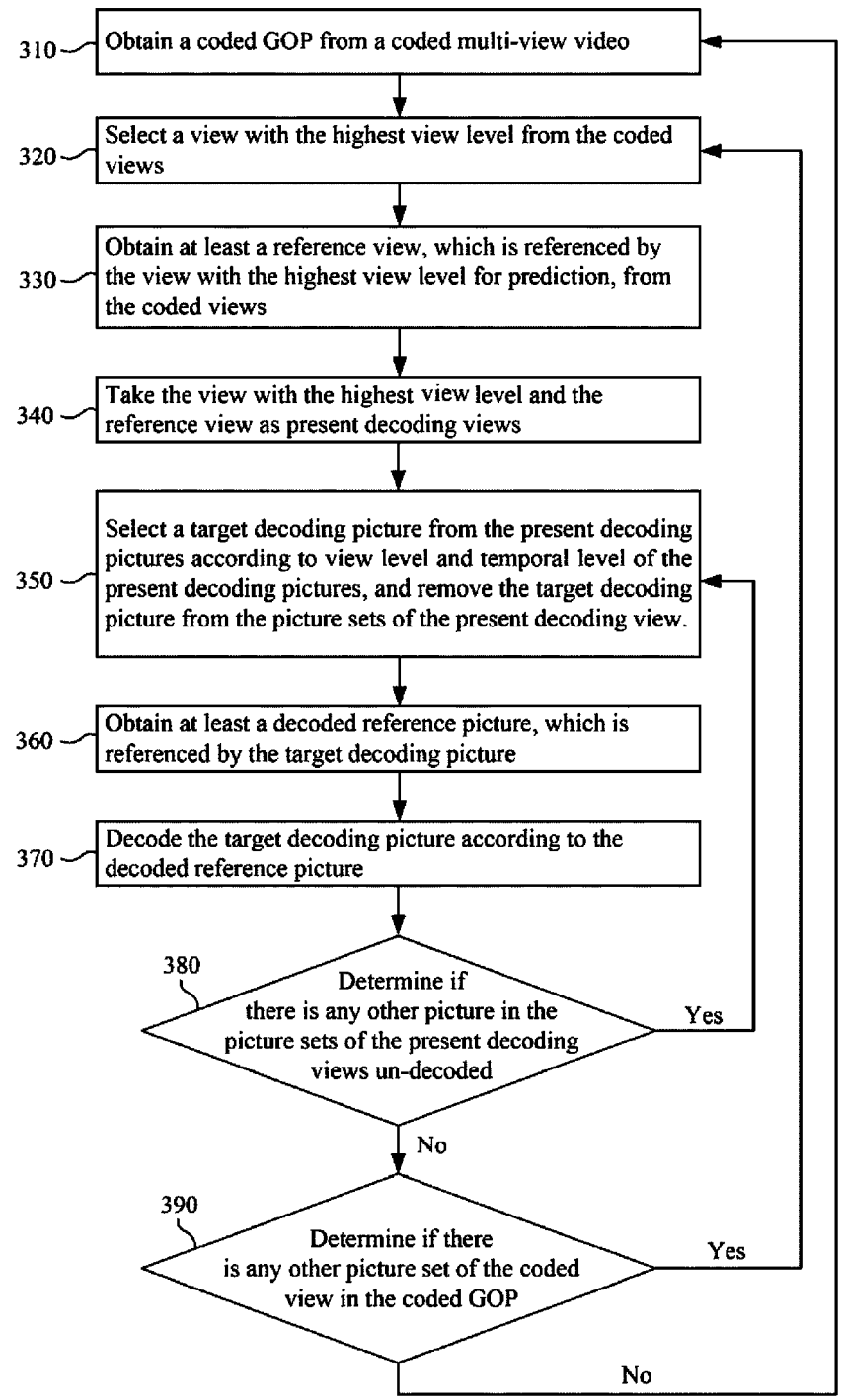
FIG. 4 is a flow diagram of a multi-view video decoding method according to an embodiment of this invention.

FIG. 4 is a flow diagram of a multi-view video decoding method according to an embodiment of this invention. In the multi-view video decoding method, each picture of a coded GOP is selected and decoded sequentially according to view level and temporal level of each picture.

Refer to FIG. 1 and FIG. 4. The multi-view video coding method 300 includes the following steps:

In step 310, obtain a coded GOP from a coded multi-view. For example, if the multi-video 100 is a coded multi-view video, pictures of the multi-view video 100 at S0~S7 during T0~T8 may be obtained as the coded GOP. Wherein, the coded GOP includes picture sets of coded view S0~S7.

In step 320, select a view with the highest view level from the coded views of the coded GOP. Therefore, S1 may be selected from the coded view S0~S7 since view level of S1 is the highest among view levels of the coded views S0~S7. In other embodiments, S3, S5 and S7 may be selected since view levels of S3, S5 and S7, which equal to view level of S1, are also the highest among view levels of the coded views S0~S7.

In step 330, obtain at least a reference view, which is referenced by the view with the highest view level for prediction, from the coded views. Therefore, S0 and S2 are selected as reference views since S0 and S2 are referenced by S1 for prediction in this embodiment.

In step 340, take the view with the highest view level and the reference view as present decoding views. Therefore, S0, S1 and S2 are taken as the present decoding views. Then, the present decoding views S0, S1 and S2 are selected from the coded views S0~S7 according to view levels of the coded views S0~S7 by step 320~step 340. Wherein, picture sets of the present decoding views S0, S1 and S2 includes several present decoding pictures S0/T0~S0/T8, S1/T0~S1/T8 and S2/T0~S2/T8, and the present decoding pictures S0/T0~S0/T8, S1/T0~S1/T8 and S2/T0~S2/T8 may be removed from the coded GOP.

In step 350, select a target decoding picture from the present decoding pictures according to view levels and temporal levels of the present decoding pictures, and remove the target decoding picture from the picture sets of the present decoding view. Wherein, step 350 may include the step of selecting a picture with highest temporal level and lowest view level from the present decoding pictures to be the target decoding picture. In detail, a view, which contains the most number of pictures with highest temporal level among the present decoding views, is selected to be a target decoding view. If the number of candidates for the target decoding view is more than one, the candidate with the lowest view level is selected to be the target decoding view. Then, select a coded picture with highest temporal level from picture sets of the target decoding view to be the target decoding picture. If the number of the candidates for the target decoding picture is more than one, the candidate, which is the first in display order among the candidates for the target decoding picture, is selected to be the target decoding picture. Therefore, since temporal level of S0 is highest and view level of S0 is the lowest among the present decoding views S0, S1 and S2, S0 is selected to be the target decoding view. Then, since S0/T1 is the picture with highest temporal level and to be the first in display order among pictures S0/T0~S0/T8 of the target decoding view S0, S0/T1 is selected to be the target decoding picture.

In step 360, obtain at least a decoded reference picture, which is referenced by the target decoding picture. Then, in step 370, code the target decoding picture according to the decoded reference picture. Since the target decoding picture S0/T1 references S0/T0 and S0/T2 for prediction, decoded reference pictures of S0/T0 and S0/T2 is obtained (step 360) for decoding the target coding picture S0/T1 (step 370).

In another embodiment, step 350 may include the step of selecting a picture with lowest temporal level and highest view level from the present decoding pictures to be the target decoding picture. In detail, pictures with lowest temporal level with the same time instance among the picture sets of the present decoding views are selected. If the number of the candidate time instances is more than one, the candidate, which is the first in display order among the candidate time instances, is selected. Then, the picture with highest view level among the selected pictures is selected to be the target decoding picture for being decoded by step 360~step 370. Therefore, since temporal levels of pictures S0/T0~S2/T0 are lowest and first in display order among the present decoding pictures S0/T0~S0/T8, S1/T0~S1/T8 and S2/T0~S2/T8, S0/T0~S2/T0 are selected. Then, picture S1/T0, whose view level is highest among the selected pictures S0/T0~S2/T0, is selected to be the target decoding picture for being coded by step 360~step 370.

In step 380, determine if there is any other picture in the picture sets of the present decoding views un-decoded. If there is at least one picture in the picture sets of the present decoding views un-decoded, select the next target decoding picture from the present decoding pictures (step 350). Therefore, the present decoding pictures would be coded sequentially by step 350~step 380.

In step 390, if there is no other picture in the picture sets of the present decoding views un-decoded, determine if there is any other picture set of the coded views in the coded GOP. Before the determination in step 390 is made, remove the picture sets of the present decoding views from the coded GOP.

If there is at least a picture set of the codes view in the coded GOP, select next view with highest view level from the coded views of the coded GOP (step 320). Therefore, the whole coded GOP would be decoded by step 320~step 380.

If there is no other picture set of the coded view in the coded GOP, obtain next coded GOP from the coded multi-view video (step 310). Therefore, the whole coded multi-view video would be decoded by step 310~step 380.

Figure 5:
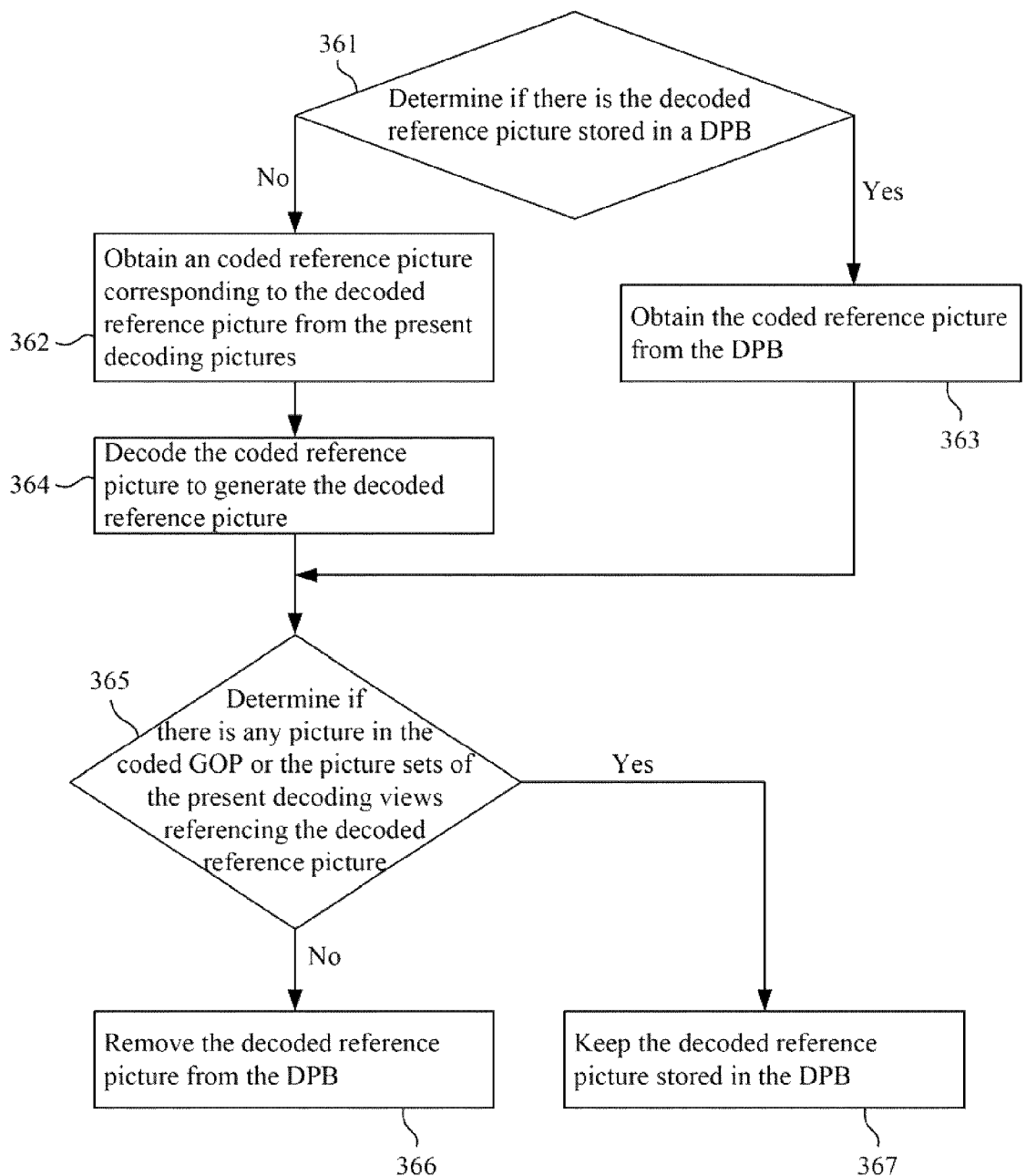
FIG. 5 is a flow diagram of obtaining the decoded reference picture (step 360) in FIG. 4.

FIG. 5 is a flow diagram of obtaining the decoded reference picture (step 360) in FIG. 4. Obtaining the decoded reference picture (step 360) includes the following steps:

In step 361, determine if there is the decoded reference picture, which is referenced by the target decoding picture for prediction, stored in a decoded picture buffer (DPB).

In step 362, if there isn't the decoded reference picture stored in the DPB, obtain a coded reference picture corresponding to the decoded reference picture from the picture sets of the present decoding views. Then, in step 364, decode the coded reference picture to generate the decoded reference picture In step 363, if there is the decoded reference picture stored in the DPB, obtain the decoded reference picture from the DPB. Therefore, the decoded reference picture may be obtained by step 361~step 364.

In addition, in step 365, determine if there is any other picture in the coded GOP or the picture sets of the present decoding views referencing the decoded reference picture for prediction. In step 367, if there is at least a picture in the coded GOP and the picture sets of the present decoding views referencing the decoded reference picture for prediction, keep the decoded reference picture stored in the DPB. In step 366, if there is no other picture in the coded GOP and the picture sets of the present decoding views referencing the decoded reference picture for prediction, remove the decoded reference picture from the DPB. Therefore, the size of the decoded picture buffer may be reduced since the decoded reference picture not being referenced latter is removed.

Above all, only partial pictures of current view/time-instance are coded (or decoded) before proceeding to the next view/time-instance to reduce lifetime of the reference pictures stored in the coded picture buffer (or DPB). Therefore, the required coded picture buffer (or DPB) size can be saved. In addition, the multi-view video decoding method in this invention can decode coded multi-view videos that applied the same prediction structure thereof. Namely, the multi-view video decoding method in this invention is compatible with all multi-view video coding methods that applied the same prediction structure thereof.

Although the present invention has been described in considerable detail with reference to certain embodiments thereof, other embodiments are possible. Therefore, their spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A multi-view video coding method comprising:
    obtaining an un-coded group of pictures (GOP) from an un-coded multi-view video, wherein the un-coded GOP comprises picture sets of a plurality of un-coded views;
    selecting a plurality of present coding views from the un-coded views according to view levels of the un-coded views, wherein picture sets of the present coding views comprises a plurality of present coding pictures, and the view levels of the un-coded views are classified according to inter-view prediction applied to the un-coded views,
    wherein view level of a predicted picture is defined to be the highest view level of a referenced picture, which is referenced by the predicted picture for prediction, plus 1,
    wherein view level of a predicted picture without referencing to other views is defined to 0,
        wherein the step of selecting the present coding views from the un-coded views according to the view levels of the un-coded views comprises:
        selecting a view with the highest view level from the un-coded views;
        obtaining at least a reference view, which is referenced by the view with the highest view level for prediction, from the un-coded views; and
        taking the view with the highest view level and the reference view as the present coding views;
    selecting a target coding picture from the present coding pictures according to view levels and temporal levels of the present coding pictures, wherein the temporal levels of the present coding pictures are classified according to relationship of temporal prediction applied to the present coding pictures;
    obtaining at least a coded reference picture, which is referenced by the target coding picture for prediction; and
    coding the target coding picture according to the coded reference picture.

2. The multi-view video coding method of claim 1, wherein the step of selecting the target coding picture from the present coding pictures according to the view levels and the temporal levels of the present coding pictures comprises:
    selecting a picture with the highest temporal level and lowest view level from the present coding pictures to be the target coding picture.

3. The multi-view video coding method of claim 1, wherein the step of selecting the target coding picture from the present coding pictures according to the view levels and the temporal levels of the present coding pictures comprises:
    selecting a picture with the lowest temporal level and highest view level from the present coding pictures to be the target coding picture.

4. The multi-view video coding method of claim 1, wherein the step of obtaining the coded reference picture comprises:
    determining if there is the coded reference picture stored in a coded picture buffer;
    if there isn't the coded reference picture stored in the coded picture buffer, obtaining an un-coded reference picture corresponding to the coded reference picture; and
    coding the un-coded reference picture to generate the coded reference picture.

5. The multi-view video coding method of claim 1, further comprising:
    determining if there is any other picture in the un-coded GOP or the picture sets of the present coding views referencing the coded reference picture for prediction; and
    if there is no picture in the un-coded GOP or the picture sets of the present coding views referencing the coded reference picture for prediction, removing the coded reference picture from the coded picture buffer.

6. The multi-view video coding method of claim 5, further comprising:
    if there is at least a picture in the un-coded GOP or the picture sets of the present coding views referencing the coded reference picture for prediction, keeping the coded reference picture stored in the coded picture buffer.

7. The multi-view video coding method of claim 1, further comprising:
removing the picture sets of the present coding views from the un-coded GOP.

8. The multi-view video coding method of claim 1, further comprising:
determining if there is any other picture in the picture sets of the present coding views un-coded;
selecting next target coding picture from the present coding pictures when there is at least one picture in the picture sets of the present coding views un-coded: and
removing the picture sets of the present coding views from the un-coded GOP when there is no other picture in the picture sets of the present coding views un-coded.

9. A multi-view video decoding method comprising:
obtaining a coded GOP from a coded multi-view video, wherein the coded GOP comprises picture sets of a plurality of coded views;
selecting a plurality of present decoding views from the coded views according to view levels of the coded views, wherein picture sets of the present decoding views comprises a plurality of present decoding pictures, and the view levels of the coded views are classified according to inter-view prediction applied to the coded views,
wherein view level of a predicted picture is defined to be the highest view level of a referenced picture, which is references by the predicted picture for prediction, plus 1,
wherein view level of a prediction picture without referencing to other views is defined to 0,
wherein the step of selecting the present decoding views from the coded views according to the view levels of the coded views comprises:
selecting a view with the highest view level from the coded views;
obtaining at least a reference view, which is referenced by the view with the highest view level for prediction, from the coded views; and
taking the view with the highest view level and the reference view as the present decoding views;
selecting a target decoding picture from the present decoding pictures according to view levels and temporal levels of the present decoding picture, wherein the temporal levels of the present decoding pictures are classified according to relationship of temporal prediction applied to the present decoding pictures;
obtaining at least a decoded reference picture, which is referenced by the target decoding picture for prediction; and
decoding the target decoding picture according to the decoded reference picture.

10. The multi-view video decoding method of claim 9, wherein the step of selecting the target decoding picture from the present decoding pictures according to the view levels and the temporal levels of the present decoding pictures comprises:
selecting a picture with the highest temporal level and lowest view level from the present decoding pictures to be the target decoding picture.

11. The multi-view video decoding method of claim 9, wherein the step of selecting the target decoding picture from the present decoding pictures according to the view levels of the present decoding pictures and the temporal levels of the present decoding pictures comprises:
selecting a picture with the lowest temporal level and highest view level from the present decoding pictures to be the target decoding picture.

12. The multi-view video decoding method of claim 9, wherein the step of obtaining the decoded reference picture, which is referenced by the target decoding picture, comprises:
determining if there is the decoded reference picture stored in a decoded picture buffer (DPB);
if there isn't the decoded reference picture stored in the DPB, obtaining a coded reference picture corresponding to the decoded reference picture; and
decoding the coded reference picture to generate the decoded reference picture.

13. The multi-view video decoding method of claim 12, further comprising:
determining if there is any other picture in the coded GOP or the picture sets of the present decoding views referencing the decoded reference picture for prediction; and
if there is no picture in the coded GOP or the picture of the present decoding views referencing the decoded reference picture for prediction, removing the decoded reference picture from the DPB.

14. The multi-view video decoding method of claim 13, further comprising:
if there is at least a picture in the coded GOP or the picture sets of the present decoding views referencing the decoded reference picture for prediction, keeping the decoded reference picture stored in the DPB.

15. The multi-view video decoding method of claim 9, further comprising:
removing the picture sets of the present decoding views rom the coded GOP.

16. The multi-view video decoding method of claim 9, further comprising:
determining if there is any other picture in the picture sets of the present decoding views un-decoded;
selecting next target decoding picture from the present decoding pictures when there is at least one picture in the picture sets of the present decoding views un-decoded: and
removing the picture sets of the present decoding views from the coded GOP when there is no other picture in the picture sets of the present decoding views un-decoded.

* * * * *